(12) United States Patent
Wang et al.

(10) Patent No.: US 7,130,318 B2
(45) Date of Patent: Oct. 31, 2006

(54) ELECTROOPTIC Q-SWITCH ELEMENT MADE OF CRYSTAL

(75) Inventors: Jiyang Wang, Jinan (CN); Xin Yin, Jinan (CN); Shaojun Zhang, Jinan (CN); Xiaobo Hu, Jinan (CN); Huaijin Zhang, Jinan (CN); Minhua Jiang, Jinan (CN)

(73) Assignee: Shandong University, Shandong Province (CN)

( * ) Notice: Subject to any disclaimer, the term of this patent is extended or adjusted under 35 U.S.C. 154(b) by 54 days.

(21) Appl. No.: 10/441,404

(22) Filed: May 20, 2003

(65) Prior Publication Data

US 2003/0214983 A1 Nov. 20, 2003

(30) Foreign Application Priority Data

May 20, 2002 (CN) ................. 02 1 10374

(51) Int. Cl.
*H01S 3/11* (2006.01)
*H01S 3/115* (2006.01)
(52) U.S. Cl. .......................... 372/10; 372/12
(58) Field of Classification Search ................. 372/10, 372/13, 98, 12
See application file for complete search history.

(56) References Cited

U.S. PATENT DOCUMENTS

| | | | |
|---|---|---|---|
| 3,815,046 A * | 6/1974 | Johnson et al. | 372/12 |
| 3,828,276 A * | 8/1974 | Cohen | 372/13 |
| 4,968,881 A * | 11/1990 | Takahashi et al. | 250/231.1 |
| 5,384,798 A * | 1/1995 | Zucker et al. | 372/26 |
| 6,261,420 B1 * | 7/2001 | Kubota et al. | 204/157.4 |

OTHER PUBLICATIONS

Yin et al, Electrooptic properties and electrooptic Q switch of La3Ga5SiO14 single crystal, Dec. 15, 2002, Jpn. J. Appl. Phys. vol. 41 (2002) 7419-7421.*

Stade et al., "Electro-optic, Piezoelectric and Dielectric Properties of Langasite ($La_3Ga_5SiO_{14}$), Langanite ($La_3Ga_{5.5}Nb_{0.5}O_{14}$) and Langataite ($La_3Ga_{5.5}Ta_{0.5}O_{14}$)," *Cryst. Res. Technol.*, 37 (2002) 10, pp. 1113-1120.

Bohm et al., "Czochralski growth and characterization of piezoelectric single crystals with langasite structure: $La_3Ga_5SiO_{14}$ (LGS), $La_3Ga_{5.5}Nb_{0.5}O_{14}$ (LGN) and $La_3Ga_{5.5}Ta_{0.5}O_{14}$ (LGT) Part I," *Journal of Crystal Growth*, 204 (1999) pp. 128-136.

Bohm et al., "Czochralski growth and characterization of piezoelectric single crystals with langasite structure: $La_3Ga_5SiO_{14}$ (LGS), $La_3Ga_{5.5}Nb_{0.5}O_{14}$ (LGN) and $La_3Ga_{5.5}Ta_{0.5}O_{14}$ (LGT) II. Piezoelectric and elastic properties," *Journal of Crystal Growth*, 216 (2000) pp. 293-298.

* cited by examiner

*Primary Examiner*—Armando Rodriguez
(74) *Attorney, Agent, or Firm*—Alston & Bird LLP

(57) ABSTRACT

This invention is a kind of electrooptic Q-switch element made of a single crystal and belongs to the application of crystal in electrooptic technology field. The invention consists of electrooptic Q-switch which is made of $La_3Ga_5SiO_{14}$ or $Nd:La_3Ga_5SiO_{14}$ or the other related crystal materials such as $La_3Ga_{5-x}Al_xSiO_{14}$, $Sr_3Ga_2Ge_4SiO_{14}$, $Na_2CaGe_6O_{14}$, $Ca_3Ga_2Ge_4O_{14}$, $La_3Ga_{5.5}Nb_{0.5}O_{14}$ and $La_3Ga_{5.5}Ta_{0.5}O_{14}$ with the common shape or a specific shape containing Brewster angle as shown in figure. This kind of electrooptic Q-switch can be used in YAG laser and other laser. It overcomes the shortages of the commercial Q-switches, such as the high, un-adjustable, low stable half-wave voltage and great half-wave voltage variation with temperature. The advantage of this kind of electrooptic Q-switch is its low, adjustable, high stable half-wave voltage.

7 Claims, 1 Drawing Sheet

ELECTROOPTIC Q-SWITCH ELEMENT MADE OF CRYSTAL

FIELD OF THE INVENTION

Figure 1:
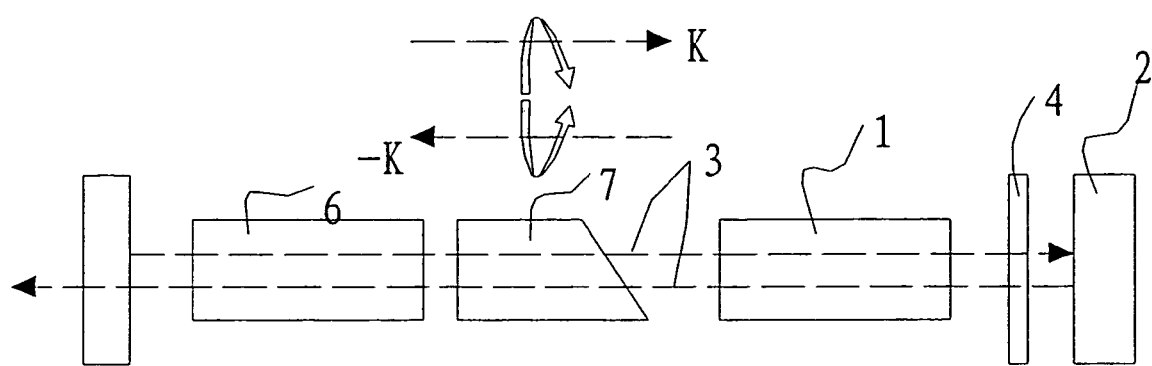

This invention is directed to the use of crystal materials in the field of electrooptic technology. More particularly the invention is directed to a new electrooptic Q-switch made of crystal.

DESCRIPTION OF RELATED ART

Electrooptic Q-switches are important optical elements in laser technology. For a crystal to be used as an electrooptic element, it must possess the following physical properties: 1) large electrooptic coefficient and low half-wave voltage; 2) high damage threshold; 3) suitable transmission wavelength range; 4) high electrical resistance; 5) low dielectric constant; and 6) stable physical and chemical properties.

To date, only two kinds of electrooptic Q-switches are commercially available. They are made of DKDP and $LiNbO_3$ crystals, respectively. The former has a high damage threshold and good optical homogeneity. When its longitudinal electrooptic effect is utilized as an electrooptic Q-switch, a circular electrical pole must be coated in the crystal. This makes fabricating the electrooptic Q-switch difficult. Another disadvantage of a DKDP electrooptic Q-switch is its high and non-adjustable half-wave voltage, which changes greatly with temperature. Furthermore, DKDP crystal is deliquescent, so that moisture protection must be considered. Thus the element fabrication process is very complicated.

An advantage of $LiNbO_3$ as an electrooptic Q-switch is that its half-wave voltage is adjustable with the ratio of longitudinal to transversal length of crystal. Also the transversal electrooptic effect is utilized when the crystal is used as an electrooptic Q-switch. Thus fabricating the electrooptic Q-switch using $LiNbO_3$ crystal is convenient. Disadvantages of using $LiNbO_3$ as an electrooptic Q-switch include: low threshold, low optical homogeneity, and large half-wave voltage variation with temperature at low temperature conditions. Therefore, the above referenced crystal Q-switch elements do not meet all of the requirements for use as an electrooptic element.

Langasite ($La_3Ga_5SiO_{14}$, abbreviated as LGS) is a piezoelectric crystal with good physical properties. In 1982, the laser expert A. A. Kaminsky reported the laser property of Nd:LGS crystal. A. A. Kaminsky, S. E. Sarkisov, Reports of the USSR Academy of Science, 1982, 264(1):93. Later, growth and laser properties of Nd:LGS, Nd:$Ca_3Ga_2Ge_4O_{14}$ and $Sr_3Ga_2Ge_4O_{14}$ were reported. A. A. Kaminsky, B. V. Mill, G. G. Khodzhabagyan, Phys.Stat.Sol.(a), 1983, 80:387; A. A. Kaminsky, I. M. Silvestroval, S. E. Sarkisov, Phys.Stat.Sol.(a), 1983, 80:607; A. A. Kaminsky, E. L. Belokoneva, B. V. Mill, Phys.Stat.Sol.(a), 1984, 86:345. In 1984, A. I. Andreev reported that the elastic vibration for a LGS single crystal possessed zero temperature coefficient cut-type. A. I. Andreev, M. F. Doubvik, Letters to J. Theory Physics, 1984, 10(8):487. In 1986, a SAW single chip filter and resonance device with high stability was fabricated by E. G. Bronnikova et al. E. G. Gronnikova, I. M. Larionov, Electronic Engineering Series, "Radiodetails and Compounds", 1986, 2:63. S. A. Sarkissov et al. applied for a patent for a single chip LGS crystal filter. S. A. Sakharov, I. M. Larionov, patent application 1986, No. 4886181/22 of 28.11.90.

Later, scientists from America, Germany, Japan and Korea studied the LGS family of crystals. In addition to the Russian scientists, scientists from Japan joined in this research and companies began to try to exploit the related device. A scientist from China also studied the research and applications for the crystal. Hu Shaogin, Piezoelectricity and acoustic-optics, 1999,21(4):299. To date, no one has reported investigations of the application of LGS and its family of crystals in electrooptic devices.

Electrooptic properties result from a change of refractive index effected by an electric field. Electrooptic Q-switches and electrooptic modulators can be fabricated by utilizing the electrooptic effect. LGS family crystals (32 point group symmetry) possess both electrooptic effect and optical activity. The term optical activity means that the polarization plane will rotate at an angle proportional to the crystal thickness when a monochromic plane wave propagates through a crystal. Some study of the interaction between electrooptic effect and optical activity has been performed. It was thought that fabricating electrooptic devices using a crystal with active optical properties would be difficult due to the polarization plane rotation effected by optical activity. To date, no one has reported electrooptic device fabrication using a crystal with optical activity.

BRIEF SUMMARY OF THE INVENTION

The present invention provides a new electrooptic Q-switch made of a single crystal with optical activity. The invention overcomes the disadvantages of commercial electrooptic Q-switches, such as high, non-adjustable half-wave voltage, low stability with temperature, low optical damage threshold and deliquescence.

The new electrooptic Q-switch of the invention includes a langasite ($La_3Ga_5SiO_{14}$) crystal, advantageously a rectangular piece of langasite crystal, and a reflecting element located on one side of the LGS crystal along the light propagation direction. The reflecting element can be an all-reflection plane mirror.

Linear polarized light passing through the LGS crystal can be reflected by the reflecting element and then returned to the LGS crystal, and the rotation angle of the polarization plane is zero. A wave plate of $\lambda/4$, wherein $\lambda$ is the wavelength of the propagation light in LGS, can be installed between the LGS crystal and the reflecting element. The langasite crystal can be LGS, or Nd-doped LGS, or $La_3Ga_{5-x}Al_xSiO_{14}$ (the value of x is 0–5), or $Sr_3Ga_2Ge_4O_{14}$, or $Na_2CaGe_6O_{14}$, or $Ca_3Ga_2Ge_4O_{14}$, or $La_3Ga_{5.5}Nb_{0.5}O_{14}$, or $La_3Ga_{5.5}Ta_{0.5}O_{14}$ crystal.

Two end faces of the LGS crystal perpendicular to the direction of the light can be polished and coated with anti-reflection films for 1.06411 µm laser. The length along the Z direction (the light propagation direction) of the LGS crystal can range from 8 mm to 1500 mm, and the width (along the X or Y direction) and thickness (along the X or Y direction) perpendicular to the direction of the length can range from 4 mm to 20 mm.

In addition, two end faces of the LGS crystal along the direction of the light propagation may be processed to be the Brewster's angle and polished. The Brewster's angle is 62° for the 1.064 µm laser. The length of the Z direction of the LGS crystal can range from 8 mm to 1500 mm, the width along the X direction can range from 4 mm to 15 mm, and the thickness along the Y direction can range from 4 to 15 mm. The electric field is applied along the Y direction.

The electrooptic Q-switch of the invention is particularly suitable for medium power lasers widely used at present.

One advantage of the invention is that it can prevent the optical activity of the LGS crystal from influencing the electrooptic property. Based on the efficient electrooptic coefficients and optic damage threshold of LGS crystal, a new electrooptic Q-switch, possessing the advantages of low, adjustable half-wave voltage, high stability with temperature, high optical damage threshold and non-deliquescent, can be designed and successfully fabricated by utilizing the transversal electrooptic effect of the crystal.

The LGS crystal belongs to the trigonal system, with point group 32, and possesses electrooptic effect and optical activity. The electrooptic coefficients of the LGS crystal are $\gamma_{11}=-\gamma_{12}=-\gamma_{62}=2.3\times10^{-12}$ m/V, and the optic damage threshold is 9.5 times of that of the LiNbO$_3$ crystal. The results above show that the LGS crystal can be used to fabricate the electrooptic Q-switch. The electrooptic Q-switch utilizes the transversal electrooptic effect of the crystal, and the half-voltage $V_\pi$ can be adjusted by changing the aspect ratio l/d, according to the formula $$V_\pi = \frac{\lambda}{2n_0^3 \gamma_{11}(l/d)}$$

wherein $\lambda$ is the wavelength of the laser, $n_o$ is the refractive index of the o light, and l/d is the ratio of the length along the direction of the light propagation to the thickness along the direction of the electric field applied to the crystal, called the aspect ratio.

In addition to the electrooptic effect, the LGS crystal also possesses optical activity. This makes designing a Q-switch difficult. In this invention, the light propagates along the optic axis, and the plane polarized light goes forward and backward through the LGS crystal in the laser resonant cavity, so the total rotation angle of the polarization plane is zero. The design avoids the influence of optical activity on the polarized plane rotation of plane polarized light propagation in crystal. The Q-switch works by utilizing orthogonal polarized light interference.

In addition, the hardness of the LGS crystal is 5.5 (Mohs hardness), the LGS crystal is non-cleaving, and there is no phase transformation point between the room temperature and its melting point 1470° C. The crystal is non-deliquescent, so moisture protection is not required.

In this invention, a wave plate of $$\frac{\lambda}{4}$$

can be installed between the LGS crystal and the reflecting element. If a plane polarized light passes through the LGS crystal, its polarized direction will rotate an angle of $\phi$. Then it passes through the wave plate of $$\frac{\lambda}{4},$$

and is reflected back through the wave plate again by the reflecting element. It finally takes the same polarized direction as before it entered the wave plate of $$\frac{\lambda}{4},$$

and only the phase of the plane polarized light is changed for $$\frac{\pi}{2}.$$

When the light goes back through the LGS crystal, the rotation direction for either left-rotating or right-rotating polarized light will be the reverse of the rotation direction of the light after it penetrated the LGS crystal the first time, because the LGS crystal Q-switch is closed and no electric field is applied. Eventually when the plane polarized light composed of the left-rotating and right-rotating polarized light exits the LGS crystal, its polarized direction will be the same as when it first entered the LGS crystal, and only the phase of the plane polarized light is changed for $$\frac{\pi}{2}.$$

This is equivalent to converting parallel polarization light interference into orthogonal polarization light interference. Compared with parallel polarization light interference, orthogonal polarized light interference can avoid the influence of electrooptic effect on optical activity, because an electric field is not applied on the LGS crystal when the Q-switch is closed. The propagation light can still be plane polarized after it goes forward and backward through the optically active crystal. Also, the property of small birefringence of LGS crystal is utilized. The influences of the small mis-orientation and the optical non-homogeneity on the Q-switch can be reduced to some extent.

In this invention, because two end faces of the LGS Q-switch along the light propagation direction can be polished and coated with anti-reflection films for 1.064 μm laser, the transmittance of the Q-switch at 1.064 μm may be up to 99%.

In summary, the electrooptic Q-switch of the invention made of LGS crystal possesses many advantages, such as high optical damage (9.5 times of that of LN crystal), low and adjustable half-wave voltage, non-deliquescence, and small half-wave voltage variation with temperature. It is very suitable for use in an intermediate power laser.

BRIEF DESCRIPTION OF THE SEVERAL VIEWS OF THE DRAWING(S)

Figure 2:
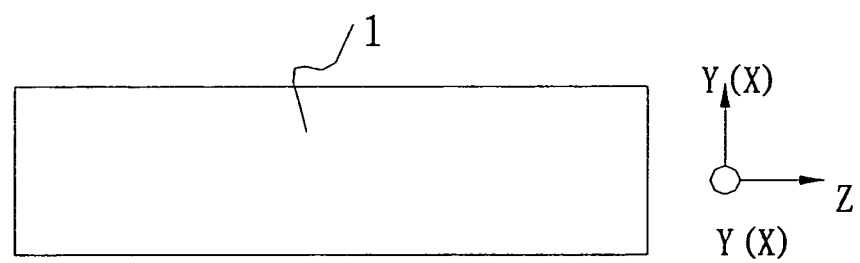

Having thus described the invention in general terms, reference will now be made to the accompanying drawings, which are not necessarily drawn to scale, and wherein:

FIG. 1 illustrates the principle of the electrooptic Q-switch of the invention; and FIG. 2 is a schematic diagram of the structure of a LGS electrooptic Q-switch of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As shown in FIG. 1 and FIG. 2, an electrooptic Q-switch device can be fabricated with a LGS crystal 1 and a reflecting element 2 placed at one side of LGS crystal 1. Reflecting element 2 is placed to reflect a laser beam back to LGS crystal 1. A plane polarized laser beam passes forward and backward through the LGS crystal twice, so that the rotation angle of the polarization plane of the beam is zero.

As mentioned above, when a plane polarized laser beam propagates through an optically active crystal, its polarization plane will rotate at an angle of $\Phi$ around a wave vector K. The rotating direction is dependent on the wave vector K. When the beam is reflected back to propagate the same distance along the wave vector −K, the rotating angle will be −$\Phi$. So $\Phi+(-\Phi)=0$. As a result, the optical activity effect of a LGS crystal is eliminated. Contrary to conventional thinking, the inventors have found that the optically active crystal can be used for an electrooptic Q-switch device.

In this invention, the transversal electrooptic effect of LGS crystal 1 was used. The half-wave voltage can be adjusted by the ratio of the longitudinal to the transversal length of the LGS crystal, and the voltage changes slightly with a change of temperature. It is not necessary to consider moisture-protection. The laser damage threshold of LGS crystal is 9.5 times of that of $LiNbO_3$ (LN) crystal. The electrooptic Q-switch of LGS crystal can have many of the same advantages of switches of DKDP and LN crystals. The electrooptic Q-switch of LGS crystal is particularly suitable for use in lasers of intermediate power.

FIG. 1 is a schematic diagram of a LGS Q-switch in a pulse laser. As shown in FIG. 1, a ¼ $\lambda$ wave plate 4 is placed between LGS crystal 1 and reflecting element 2, wherein $\lambda$ is the wavelength of laser beam. A laser beam with wavelength of 1.064 µm from Nd:YAG is linear polarized by a polarizer 7. The polarization direction is the same as the X-axis of LGS. The polarization direction of the beam will rotate an angle of $\Phi$, if the beam passes through the LGS crystal. After the beam passes through $\lambda/4$ wave plate 4, is reflected by reflecting element 2, and passes through wave plate 4 again, the polarization direction does not change, but the phase of the beam changes $\pi/2$. When no electric field is applied to the LGS crystal, i.e., the Q-switch is shut off, the right-rotating polarization beam and the left-rotating polarization beam passing through the LGS crystal have opposite polarization plane rotating directions. After the beam passes through the LGS twice, the polarization direction is unchanged but the phase of the beam changes $\pi/2$. In this way, parallel polarization interference is changed into vertical polarization interference.

Compared with parallel polarization interference, vertical polarization interference without an electric field applied to the LGS crystal prevents optical activity and ensures that the polarization direction does not change after the beam passes through the LGS crystal twice. This allows full utilization of the advantage of the small birefringence of the optically active LGS crystal and reduces the influence of orientated error and optical non-homogeneity on the Q-switch. This also imparts to the Q-switch a lower dynamic extinction ratio than static-state extinction ratio.

As shown in FIG. 1, reflecting element 2 can be a plane full-reflection-mirror.

The LGS crystal generally refers to $La_3Ga_5SiO_{14}$, $Nd:La_3Ga_5SiO_{14}$, $La_3Ga_{5-x}Al_xSiO_{14}$ (x=0~5), $Sr_3Ga_2Ge_4O_{14}$, $Na_2GaGe_6O_{14}$, $Ca_3Ga_2Ge_4O_{14}$, $La_3Ga_{5.5}Nb_{0.5}O_{14}$, $La_3Ga_{5.5}Ta_{0.5}O_{14}$ crystal, and other isomorphic heterogeneous crystals of LGS.

To increase the transmission of the LGS crystal, the end faces of the LGS crystal perpendicular to the propagation direction can be polished and coated with anti-reflection film at a wavelength 1.064 µm. The transmission of coated LGS crystal at 1.064 µm may be more than 99%.

As shown in FIG. 2, the LGS crystal can be processed with a length l=8 mm~1500 mm in the Z-axis direction, which is the propagation direction of the laser beam, with a thickness d=4 mm~20 mm in the X- or Y-axis direction, and with a width w=4 mm~20 mm, which is perpendicular to the length and the thickness. For example, the size of a LGS crystal Q-switch can be l=40.3 mm in the Z-axis direction, d=6.12 mm in the Y-axis direction, and w=6.12 mm in the X-axis direction. A laser beam propagates along the Z-axis. An electric field can be applied parallel to the Y-axis. The LGS Q-switch can work effectively with a half-wave voltage of 2250V in a Nd:YAG laser with a pulse output energy of 350 mJ at repetition rates of 1 Hz or 10 Hz.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A single crystal electrooptic Q-switch device, comprising:
   a langasite (LGS) electrooptic single crystal having an optical activity; and
   a reflection element, the reflection element being arranged on one side of the LGS crystal along a direction defined by the optical axis of the LGS crystal, the Q-switch device being arranged to receive a linearly polarized light beam at a side of the LGS crystal opposite to the side where the reflection element is disposed, the light beam propagation direction being parallel to the optical axis of the LGS crystal so that an incident light beam propagating through the LGS crystal along the optical axis is reflected by the reflection element and passes through the LGS crystal again such that the rotation angle of the polarization plane of the light originating from the optical activity of the LGS crystal is zero degrees.

2. The single crystal electrooptic Q-switch device of claim 1, wherein the LGS single crystal is rectangular.

3. The single crystal electrooptic Q-switch device of claim 1, further comprising a $\lambda/4$ wave-plate between the LGS crystal and the reflection element, wherein $\lambda$ is the wavelength of light propagating in the LGS crystal.

4. The single crystal electrooptic Q-switch device of claim 1, wherein the LGS crystal is $La_3Ga_5SiO_4$ crystal, Nd doped $La_3Ga_5SiO_{14}$ crystal, $La_3Ga_{5-x}Al_xSiO_{14}$ crystal wherein x ranges from 0 to 5, $Sr_3Ga_2Ge_4O_{14}$ crystal, $Na_2CaGe_6O_{14}$ crystal, $Ca_3Ga_2Ge_4O_{14}$ crystal, $La_3Ga_{5.5}Nb_{0.5}O_{14}$ crystal, or $La_3Ga_{5.5}Ta_{0.5}O_{14}$ crystal.

5. The single crystal electrooptic Q-switch device of claim 1, wherein both end faces of the LGS crystal are polished and coated with an anti-reflection film for a 1.064 µm laser.

6. The single crystal electrooptic Q-switch device of claim 1, wherein the length of the LGS crystal in the light propagation direction or in the z direction ranges from 8 to 1500 mm, and wherein the thickness of the LGS crystal in the x or y direction ranges from 4 to 20 mm.

7. The single crystal electrooptic Q-switch device of claim 1, wherein the reflection element is an all-reflection plane mirror.

* * * * *